United States Patent [19]

Meltz et al.

[11] 4,295,738

[45] Oct. 20, 1981

[54] FIBER OPTIC STRAIN SENSOR

[75] Inventors: Gerald Meltz, Avon; Elias Snitzer, West Hartford, both of Conn.

[73] Assignee: United Technologies Corporation, Hartford, Conn.

[21] Appl. No.: 162,283

[22] Filed: Jun. 23, 1980

Related U.S. Application Data

[63] Continuation-in-part of Ser. No. 71,512, Aug. 30, 1979, abandoned.

[51] Int. Cl.³ .............................................. G01B 11/16
[52] U.S. Cl. ........................................ 356/32; 73/800; 356/33
[58] Field of Search ....................... 356/32, 33, 43, 44; 73/800; 350/96.33

[56] References Cited

U.S. PATENT DOCUMENTS 4,148,560  4/1979  Margolis ........................... 350/96.23
4,151,747  5/1979  Gottlieb et al. ................... 73/356 X
4,173,412 11/1979  Ramsay et al. .......................... 356/33
4,203,326  5/1980  Gottlieb et al. ........................ 356/44

OTHER PUBLICATIONS

"Optical Sensing Apparatus and Method"; Macedo et al; International Publication Number WO 79/00377; Jun. 28, 1979; pp. 17-31.

Primary Examiner—Vincent P. McGraw
Attorney, Agent, or Firm—Richard P. Lange

[57] ABSTRACT

An optical fiber having at least two cores positioned in a common cladding can be fabricated to be responsive to strain or hydrostatic pressure but not to temperature through the selection of materials, spacing and shape of the cores and cladding in the fiber. Accordingly, the cross-talk between adjacent cores in the optical waveguide can be optimized to respond to a change in hydrostatic pressure or in unidirectional strain along the length of the fiber. The strain or pressure change, can be determined by measuring the relative intensity of light emerging from the different cores of the fiber. A larger unambiguous range for strain or hydrostatic pressure changes can be provided by a multi-core optical fiber embodiment.

11 Claims, 12 Drawing Figures

FIBER OPTIC STRAIN SENSOR

This is a continuation-in-part of U.S. patent application Ser. No. 071,512, filed Aug. 30, 1979, now abandoned, for FIBER OPTIC TEMPERATURE/STRAIN SENSOR and is assigned to the same assignee as the parent case.

CROSS REFERENCE TO RELATED APPLICATION

The subject matter of this patent application is related to U.S. patent application Ser. No. 162,284, filed June 23, 1980 by the same inventors for FIBER OPTIC TEMPERATURE SENSOR, and it is assigned to the same assignee.

DESCRIPTION

1. Technical Field

This device relates generally to optical waveguide sensor, and more particularly, to an optical waveguide having at least two cores particularly shaped and positioned in a common cladding so that the light is coupled, or cross-talks, between the adjacent cores as a function of strain or hydrostatic pressure only thereby causing the optical waveguide to act as a strain or hydrostatic pressure sensor.

2. Background Art

Optical waveguides have been known for many years and, with the advent of low loss glasses, devices incorporating optical waveguides have been employed in ever-increasing numbers, in many different fields such as communications and monitors. An optical waveguide typically consists of a dielectric core fabricated from a glass, or the like, having a certain refractive index, and this core is surrounded by a second material, also normally glass or the like, having a lower refractive index. This surrounding material is generally known as the cladding. A beam of light is guided by this composite structure so long as the refractive index of the material comprising the core exceeds the refractive index of the material forming the cladding. A light beam within the core is guided generally along the core axis by reflection of the boundary between the core and the cladding.

A number of different designs for optical waveguides have been proposed including the multimode step index profile, the single mode profile, and the multimode graded index profile. Where a single mode is desired, the single mode optical waveguide is used. In such a waveguide, the diameter of the core is typically less than 10 $\mu$m and the difference between the refractive indices of the cores and the cladding is on the order of $10^{-3}$. As a result, only the lowest order mode will be supported in such a waveguide.

Optical cables have also been fabricated which include multiple cores disposed in numerous different arrays and positioned within a common cladding. One such disclosure is contained in U.S. Pat. No. 4,148,560 issued Apr. 10, 1979 to D. Margolis for OPTICAL GUIDES. This disclosure is directed toward an assembly including a plurality of fibers embedded in an encapsulating material. This particular patent shows an optical bundle positioned between two reinforcing wires and embedded in a protective sheath of plastic material.

The phenomena known as "cross-talk" between cores in a common cladding occurs when the light energy propagating along one core is coupled to an adjacent core. This occurs because, as is known, the light energy is not totally confined by the boundary between the core and cladding but, in fact, it penetrates to a small degree into the cladding.

It has been recognized that the cross-talk phenomena in a waveguide having at least two cores will vary to some extent as a function of temperature. For example, in a treatise entitled OPTICAL WAVEGUIDES by N. S. Kapany and J. J. Burke published in 1972, it was recognized that in two closely spaced glass fiber cores positioned in a cladding experienced an optical beat phenomena. Beginning on page 255, there is an experiment described in which the optical beat phenomena of the aforementioned optical waveguide varies in response to changes in the ambient temperature.

A temperature sensor employing an optical waveguide is described in U.S. Pat. No. 4,151,747 issued May 1, 1979 to M. Gottlieb et al for MONITORING ARRANGEMENT UTILIZING FIBER OPTICS. A temperature sensor consists of an optical waveguide. A light source is positioned at one end of the waveguide and a detector is located at the other end. Temperature changes are then perceived by variations in the light received at the detector. Another embodiment includes two optical fibers positioned adjacent each other in a common cladding. Input light is conducted along the length of one fiber and passes out of the wall of that fiber in an amount which varies with the temperature of the fiber. The second fiber is in sufficiently close proximity to the first fiber for capturing at least some of the light passing out of the first fiber. By monitoring the light received in the second fiber, a determination can be made as to the amount of temperature variation.

Of interest is a copending patent application U.S. Application Ser. No. 071,511 entitled FIBER OPTIC HOT SPOT DETECTOR filed on Aug. 30, 1979 by the same applicants which describes an optical fiber that can be embedded in a cable, or the like, to detect hot spots. A plurality of cores in the common cladding are particularly shaped and spaced from each other so that cross-talk initially occurs at the point where the temperature exceeds a predetermined level. The wavelength of the light propagating along the fiber can be changed so that the precise point of the hot spot along the cable can be identified.

DISCLOSURE OF INVENTION

It is an object of the present invention to provide an optical waveguide which is particularly well suited to measure changes in hydrostatic pressure or strain independent of any temperature change.

According to the present invention, an optical waveguide having two or more cores is fabricated in a manner so as to optimize the response to variation in strain or hydrostatic pressure.

According to a feature of the present invention, an optical waveguide has a plurality of cores which are fabricated from selected materials and formed in such a manner that cross-talk between adjacent cores is primarily a function of strain or hydrostatic pressure, and is relatively unresponsive to changes in temperature. As light energy propagates along one core in the optical fiber, changes in strain or in hydrostatic pressure cause a change in the relative energy that is cross-coupled between the cores.

A significant feature of the present invention is that an optical waveguide having multiple cores can be so fabricated that cross-talk between adjacent cores is a function of hydrostatic pressure or strain independent of any variation in temperature. Light energy propagating along one core then is coupled, or cross-talk, to adjacent cores only as a function of hydrostatic pressure or of strain thereby optimizing the optical waveguide as a strain sensor.

The foregoing and other objects, features and advantages of the present invention will become more apparent from the following description of preferred embodiments and accompanying drawings.

BEST MODE FOR CARRYING OUT THE INVENTION

Figure 1:
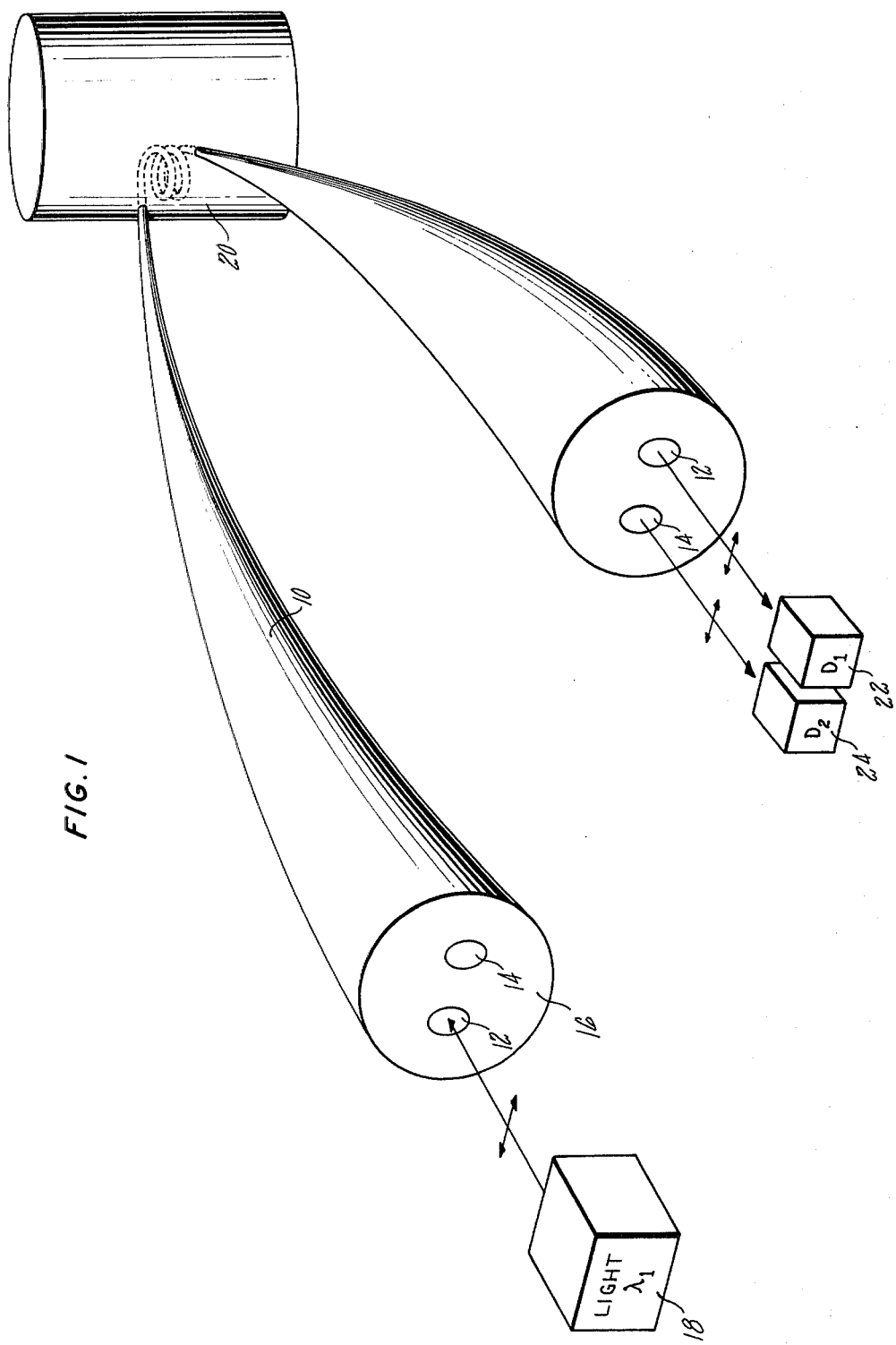
FIG. 1 is an enlarged schematic illustration depicting a pressure measuring system incorporating an optical fiber according to the present invention which has been optimized to sense changes in hydrostatic pressure.

Referring initially to FIG. 1, there is an optical waveguide 10 according to the present invention which has been optimized to respond to changes in strain or hydrostatic pressure along its length, independent of any changes in temperature. The optical fiber includes at least two cores 12 and 14 which are ideally arranged in an array across the diameter and extend along the entire length of the optical cable 10. A cladding 16 is provided and totally surrounds each of the cores 12 and 14 throughout the length of the cable. Both the cores 12 and 14 and the cladding 16 are typically fabricated from a glass material, or the like, and the selection of the precise material from which the core and cladding are fabricated, the size of the cores, the exact spacing separating the cores, the number of cores, etc., are critical and form a significant part of the present invention, as will be more apparent hereinafter.

The optical waveguide of the present invention is optimized to respond to strain or hydrostatic pressure and, as such, is particularly well suited to functioning in a system which is to measure either strain or hydrostatic pressure at some remote point. Such a system would include a source 18 located to couple a beam of light energy into one of the two cores, such as core 12. The optical fiber 10 leads from the location of the light source 18 to a second location, such as in a container 20 where a physical parameter, such as hydrostatic pressure, is to be measured. From the second location, the optical lfiber leads to another location where the emerging light from both the cores 12 and 14 is presented to the intensity of light energy incident thereon.

Figure 2:
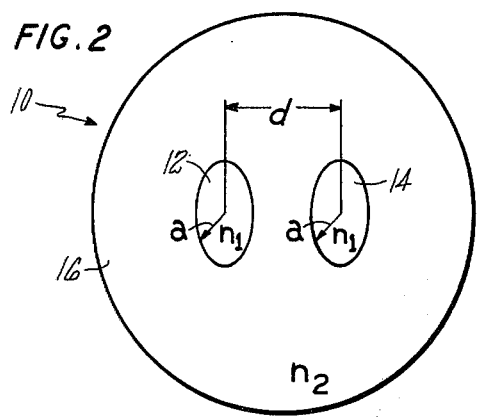
FIG. 2 is an end view of the optical fiber according to the present invention depicted in FIG. 1.

Referring to FIG. 2 in addition to FIG. 1, as is known so long as the refractive index of the cladding 16 is less than the refractive index of each of the cores 12 and 14, light energy entering either core will be substantially passed by the optical fiber 10. The number of distinct modes that will exist in the cores 12 and 14 is a function of the refractive indices of both the core material and the cladding material, the dimension of each core, and the wavelength of light propagating through the waveguide. For a circular cross section for the core, the number of modes that can exist is determined by the V parameter, which is given by the relationship:

$$V = 2\pi (a/\lambda) \sqrt{n_1^2 - n_2^2} \quad (1)$$

where a is the radius of the core, $\lambda$ is the light wavelength, $n_1$ is the refractive index of the core, and $n_2$ is the refractive index of the cladding. For the preferred elliptical cross section of the present invention, it is sufficient to take Equation (1) for the V parameter but with the value of a now given as the geometric average of the semi-major and semi-minor axis of the elliptical core dimensions. If V is less than 2.405 (the first zero of the Bessel function, $J_0$) then only the lowest order mode, known as the $HE_{11}$ mode, can be supported. For values of V that are much larger than 2.405, this occurring when the average diameter 2a of each core 12 is much larger or the difference between the refractive index of the core and that of the cladding is greater, then many modes will be supported by the waveguide.

As briefly mentioned heretofore, a significant feature of the present invention is the strain or hydrostatic pressure dependence and temperature independence of cross-talk between the individual cores in a multicore waveguide, this characteristic allowing strain or hydrostatic pressure along the length of the fiber to be measured. In such a waveguide, the materials from which the core and the cladding are carefully selected and would have refractive indices for the cores and cladding of $n_1$ and $n_2$, respectively. The spacing separating each core is relatively small while the outer diameter of the cladding is large so that interactions at the boundary formed by the outer wall of the cladding does not affect the light distribution within the cores. It is also necessary that the light propagate in each core in only the lowest order mode, the $HE_{11}$ mode, in accordance with the aforementioned Equation (1).

Referring still to FIGS. 1 and 2, as mentioned, the light source 18 emits a beam of light energy which is incident on only one of the two cores of the array, such as core 12. The light is preferably polarized in the same direction as the shortest axis of the elliptical core. As the light propagates down the fiber, cross-talk occurs to the core 14 as a function of hydrostatic pressure or strain. Thus, the distribution of light $I_1$, $I_2$ from the exit face of the fiber is a function of the strain or hydrostatic pressure acting on the fiber. The detectors 22 contain polarization analyzers so as to respond only to the same polarization as was incident on core 12. It has been found that in some cases elliptical cores oriented with their long axis parallel to each other and perpendicular to the line joining the core centers provide stronger coupling between cores for the same core area and center-to-center spacing than is the case for cores of circular cross section.

Figure 3A:
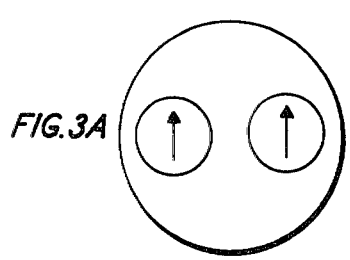
FIGS. 3A-3D are schematic illustrations of possible modes that can exist in the optical fiber according to the present invention depicted in FIG. 1.
Figure 3B:
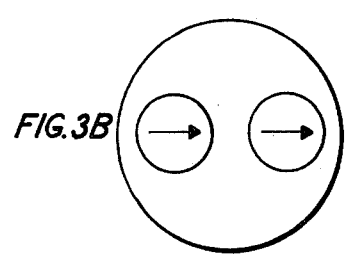
Figure 3C:
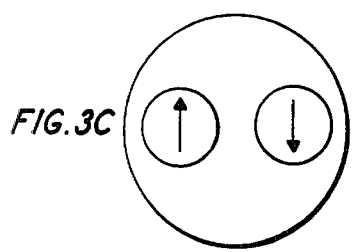
Figure 3D:
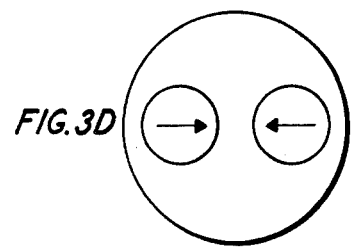

A significant aspect of the present invention relates to the change in the distribution of light energy between the cores 12 and 14 as a function of change in strain or hydrostatic pressure on the optical fiber 10. The following may be helpful in understanding this phenomena. The four normal modes which can be guided are plain polarized with the transverse E-fields aligned parallel or perpendicular to a line connecting the center of the cores. Referring additionally to FIG. 3, the four modes that can be supported comprise two orthogonally polarized pairs, a symmetric pair, FIG. 3A and FIG. 3B, and an anti-symmetric pair, FIG. 3C and FIG. 3D. Because only core 12 is excited by light energy from the source with its polarization parallel to the line connecting the centers of the core, the symmetric composite mode, FIG. 3B, and the antisymmetric composite mode, FIG. 3D, are launched with equal intensities. As the light energy propagates down the core, cross-talk occurs and the phase relationship of the modes are such that light energy is transferred between adjacent cores. As light propagates along the waveguide, modal interference causes a beat phenomena producing spatial interference that can be analyzed as an energy flow between adjacent cores. As stated above, the normal modes of the twin-core fiber are linear combinations of the lowest order $HE_{11}$ single core excitations. A normal mode is a field distribution which propagates along the fiber axis without change in its cross-sectional intensity pattern. The z (fiber axis) and time dependencies of a normal mode are given by a simple harmonic function Re [exp $\{i(\omega t - \beta_i z)\}$], where Re [...] denotes the real part of the quantity in brackets and the propagation constant $\beta_i$ has a subscript i to designate the various possible $HE_{11}$ combinations, FIGS. 3A–3D. There are four distinct field distributions which constitute the possible normal modes of the twin-core fiber. They consist of two orthogonally polarized, symmetric and antisymmetric pairs (see FIG. 3). Let $\psi_i$, i=1, 2, 3, 4, designate the amplitudes of the four normal modes. Illumination of a single core is equivalent to excitation of a pair of modes; namely, a symmetric and antisymmetric combination having the same polarization. If $\beta_2$ and $\beta_4$ are taken as the propagation constants for the symmetric mode, FIG. 3B, and the antisymmetric mode, FIG. 3D, the division of energy between the two cores is a function of the difference $2\Delta\beta = \beta_2 - \beta_4$ and the distance along the fiber. At a distance $z_1 = \pi/(2\Delta\beta)$, the two composite modes, FIG. 3B and FIG. 3D, are exactly 180° out of phase and all the light is in the right core. For a distance less than $z_1$ some of the light is in both cores, and similarly for greater distances where the phase difference between mods continues to increase. At a distance $z_2 = 2z_1$, the composite modes are exactly in phase, as they were at the entrance face; and the light returns to the left core. As the light propagates along the twin-core fiber, mode interference causes a beat phenomena producing spatial interference that can be thought of as energy interchange between cores. The beat wavelength $\lambda_b$ is $\pi/\Delta\beta$. For two circular cores of radius a with a center-to-center spacing of d, the beat wavelength is given by:

$$\lambda_b = \frac{\pi a n_1}{NA} \frac{1}{F(V, d/a)} \quad (2)$$

where $$F = (U^2/V^3) K_0(Wd/a)/K_1^2(W) \quad (3)$$

$$W = (V^2 - U^2)^{\frac{1}{2}} \quad (4)$$

$$U = (1 + \sqrt{2})V/[1 + (4 + V^4)^{\frac{1}{4}}] \quad (5)$$

The $K_0$ and $K_1$ are the modified Hankel functions of order zero to one, respectively, and d is the center-to-center separation between cores.

A change in hydrostatic pressure or strain in general causes a change in $\lambda_b$ but an expansion or contraction of the fiber length L. The net effect is a corresponding variation in the beat phase $\phi = \Delta\beta \cdot L$ at the end of the fiber of initial length L. For complete cross-talk, i.e., total power transfer from the first to the second core, it is necessary that the phase velocities for the propagation in the two cores have the same size and indices of refraction. However, it is also possible to have two cores of different glasses with different refractive indices, and correspondingly different sizes, with the same phase velocities at the wavelength of operation of the fiber. For two circular cores in a common cladding, the rate of change of beat phase with temperature is given by:

$$\frac{d\phi}{dT} = \frac{(n_1^2 - n_2^2)^{\frac{1}{2}}}{n_1} \frac{L}{a} V \frac{dF}{dV} (\alpha + \zeta) \quad (6)$$

where $\alpha$ and $\zeta$ are, respectively, the thermal coefficients of linear expansion and of the index of refraction ($n^{-1} dn/dT$) for both core and cladding, i.e., these material properties have been assumed to be the same for the core and cladding in this example of the present invention. For a change in temperature, there will be a change in dimensions of the fiber and a change in indices of refraction for cores and cladding. In general, both the thermal expansion coefficients and thermal coefficients of refractive indices for core and cladding materials are different; however, to simplify the present discussion the core and cladding thermal material properties have been assumed to be alike.

If the assumption is made that the material parameters $\alpha$ and $\zeta$ are the same for the core and cladding materials, the condition that the beat phase $\phi$ be independent of temperature is given by:

$$\frac{dF}{dV} = 0 \quad (7)$$

This is the same condition that applies for the beat phase to be independent of uniform hydrostatic pressure. Hence, a temperature independent pressure measurement based on observing the change in cross-talk cannot be made with a fiber in which the materials from which the cores and cladding are made have identical values for $\alpha$ and $\zeta$. If $\alpha$ and $\zeta$ differ for the cores and cladding, it is possible to make $\phi$ be independent of temperature but still depend on the uniform hydrostatic pressure. Alternatively, $\alpha$ and $\zeta$ can be the same for the cores and cladding, but a second cladding is fused onto the outside of the fiber as will be described hereinafter.

For a proper choice of material and thickness of the second cladding and choices for the cores and first cladding materials and their geometries, the beat phase for cross-talk between cores can be made temperature independent but also show a dependence on uniform hydrostatic pressure. For the case of stretch along the fiber axis, the cores with only one cladding, in which $\alpha$ and $\zeta$ are the same for cores and cladding, can be made to give a dependence of the beat phase on the magnitude of the longitudinal stress but be independent of both temperature and uniform hydrostatic pressure. Similarly, unidirectional stress applied transverse to the fiber axis can give a change in beat phase for the light leaving the fiber with the fiber consisting of cores and a single cladding whose $\alpha$ and $\zeta$ values for the materials of which they are made are the same and for which the V value and the d/a ratio are chosen so as to make the beat phase independent of temperature and uniform hydrostatic pressure.

Referring still to the single cladding embodiment of FIGS. 1 and 2, there are two identical cores of average radius a and center-to-center spacing d in a single uniform cladding. The material parameters for the cores are $n_1$, $\alpha$ and $\zeta_1$ and the parameters for the cladding $n_2$, $\alpha_2 = \alpha$, and $\zeta_2$, i.e., only the temperature coefficients for the refractive indices are taken as different for the refractive indices are taken as different for the cores and cladding. The condition for temperature independence for the beat phase is then:

$$\left(\frac{V}{F} \frac{dF}{dV}\right)\bigg|_0 = -\frac{n_2^2(\zeta_1 - \zeta_2)}{(n_1^2 - n_2^2)\alpha + n_1^2\zeta_1 - n_2^2\zeta_2} \quad (8)$$

where the vertical line with a zero subscript indicates temperature independence. In a response to a cylindrically symmetrical elastic deformation, the fractional change in be at phase $\Delta\phi/\phi$ for the light exiting from the end of the fiber is:

$$\frac{\Delta\phi}{\phi} = \epsilon_z - \epsilon_r + \frac{n_2^2}{n_1^2 - n_2^2}\left(\frac{\Delta n_1}{n_1} - \frac{\Delta n_2}{n_2}\right) + \frac{V}{F} \frac{dF}{dV}\left[\epsilon_r + \frac{\Delta n_1}{n_1} + \frac{n_2^2}{n_1^2 - n_2^2}\left(\frac{\Delta n_1}{n_1} - \frac{\Delta n_2}{n_2}\right)\right] \quad (9)$$

where $\epsilon_z$ and $\epsilon_r$ are the longitudinal and radial strains, which for uniform hydrostatic pressure P and for core and cladding materials whose Youngs modulus is $E_1 = E_2 = E$ and Poisson's ratio is $\nu_1 = \nu_2 = \nu$, and are given by:

$$\epsilon_z = \epsilon_r = -(1-2\nu)P/E. \quad (10)$$

In response to an elastic deformation the indices of refraction change. In general, the index of refraction for a given state of polarization is a linear function of the three principal strains. Let the strain-optic coefficient for the strain parallel to the polarization be given by $p_{11}$ and the coefficient for the strain perpendicular to the polarization be given by $p_{12}$. Furthermore, although the temperature dependence of the indices of refraction for core and cladding materials have been taken to be different, i.e., $\theta_1 \neq \zeta_2$, for simplicity in this discussion the strain-optic effects in the core and cladding materials are here assumed to be equal. The changes in indices of refraction in response to the uniform hydrostatic pressure are then given by:

$$\frac{\Delta n_2}{n_2} \equiv \frac{\Delta n_1}{n_1} = \frac{n_1^2}{2}(p_{11} + 2p_{12})(1 - 2\nu)P/E \quad (11)$$

with equations (10) and (11) substituted into Equation (9), the change in beat phase is:

$$\frac{\Delta\phi}{\phi} = -\frac{V}{F}\frac{dF}{dV}\left[1 - \frac{n_1^2}{2}(p_{11} + 2p_{12})\right](1-2\nu)P/E \quad (12)$$

If the beat phase is made temperature independent, the materials and geometry are chosen so that (V/F)(dF/dV) is given by the right side of Equation (8); and the final result for the temperature independent beat phase, which however does depend on uniform hydrostatic pressure, is given by:

$$\frac{\Delta\phi}{\phi}\bigg|_0 = \frac{n_2^2(\zeta_1 - \zeta_2)}{(n_1^2 - n_2^2)\alpha + n_1^2\zeta_1 - n_2^2\zeta_2}\left[1 - \frac{n_1^2}{2}(p_{11} + p_{12})\right](1-2\nu)P/E \quad (13)$$

Figure 4:
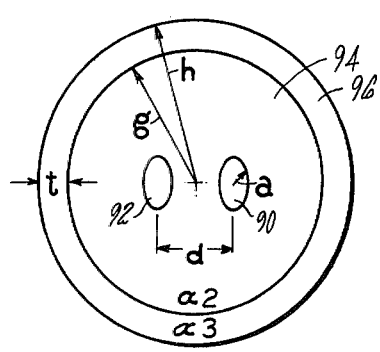
FIG. 4 is an end view of a second embodiment of an optical fiber according to the present invention which includes a second cladding.

Independent of whether the values for $\alpha$ and $\zeta$ are the same for core and cladding materials, the beat phase can be made dependent on uniform hydrostatic pressure but independent of temperature in a different way. Referring to FIG. 4, a second cladding of thickness t is fused onto the outside of the first cladding as shown. The radius of the first cladding is g and the radius of the second cladding is h. Although the cores and first cladding could have thermal expansion coefficients that are different, it is sufficient for this discussion to assume that $\alpha_1 = \alpha_2$, but that the thermal expansion coefficient of the second cladding $\alpha_3$ be different than $\alpha_2$. The Youngs modulus E and the Poisson's ratio $\nu$ are each assumed to be the same for all three regions. The condition for temperature independence of the beat phase is then:

$$\left(\frac{V}{F}\frac{dF}{dV}\right)\bigg|_0 = -\left[(1+\nu)(\alpha_3 - \alpha_2)(1 - g^2/g^2) + 2(1-\nu)n_2^2(n_1^2 - n_2^2)^{-1}(\zeta_1 - \zeta_2)\right] \times \left[(1-3\nu)(\alpha_3 - \alpha_2)(1 - g^2/h^2) + 2(1-\nu)[\alpha_2 + \zeta_1 + n_2^2(n_1^2 - n_2^2)^{-1}(\zeta_1 - \zeta_2)]\right]^{-1} \quad (14)$$

This expression can be derived by applying the boundary conditions for strains resulting from the double clad configuration.

Figure 5:
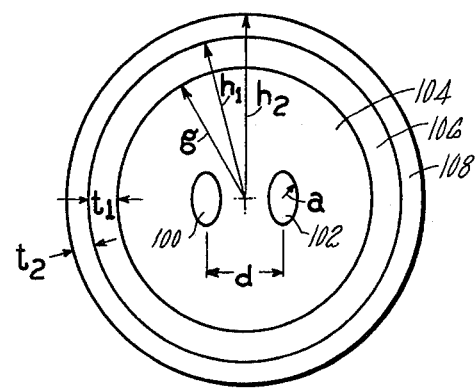
FIG. 5 is an end view of a third embodiment of an optical fiber according to the present invention which includes a second cladding and a third cladding.

The change in beat phase due to uniform hydrostatic pressure is given by Equation (9) with:

$$\frac{\Delta n_2}{n_2} = \frac{\Delta n_1}{n_1} = -\frac{n_1^2}{2}(p_{11} + 2p_{12})\epsilon_r, \quad (15)$$

and $$\epsilon_r = \epsilon_z = -(1-2\nu)P/E, \quad (16)$$

but with $(VF^{-1}dF/dV)$ given by Equation (14). The second cladding 96 can be of any material whose expansion coefficient differs from the expansion coefficient for the first cladding 94. The preferred material, because of its stability, is glass; however, it is possible to use a metal or a plastic material as well, the key requirement being that the expansion coefficient for the second cladding 96 be different from the first cladding 94. If glass is used as the second cladding 96, it may be desirable to add still another ot third cladding. The glasses commonly used for low-loss fibers for telecommunications and for sensors frequently involve very high percentages of fused silica. This material has a low expansion coefficient, so of necessity, in order to obtain a second cladding with a different expansion coefficient, it would be necessary to use a material which has a higher coefficient of thermal expansion. This is undesirable because it puts the outer surface under tension in the finished fiber and thereby creates a potential problem of fiber fracture. To avoid this problem of the outer surface being under tension, one can add an additional cladding whose expansion coefficient $\alpha_4$ is less than the expansion coefficient $\alpha_3$ for the second cladding. The thicknesses for the two additional claddings in relation to the radius for the first cladding would have to be adjusted so as to give the necessary zero temperature dependence and still obtain the required dependence on uniform hydrostatic pressure or on unidirectional longitudinal or transverse strain. FIG. 5 shows an embodiment of this invention in which the two cores 100 and 102 are surrounded by a first cladding 104, a second cladding 106 and a third cladding 108.

For stretch along the fiber axis, the structure with one cladding, and with $\alpha$ and $\zeta$ values the same for core and cladding materials, can give a temperature independent strain measurement. In this case, Equation (9) applies but with $\Delta n_1/n_1 \rightleftharpoons \Delta n_2/n_2$, $(dF)/(dV)=0$, $\epsilon_z \rightleftharpoons T/E$ and $\epsilon_r = -\nu T/E$, where T is the axial tensile force. The result is:

$$\left(\frac{\Delta \phi}{\phi}\right)\bigg|_0 = (1 + \nu)T/E. \tag{17}$$

Figure 6:
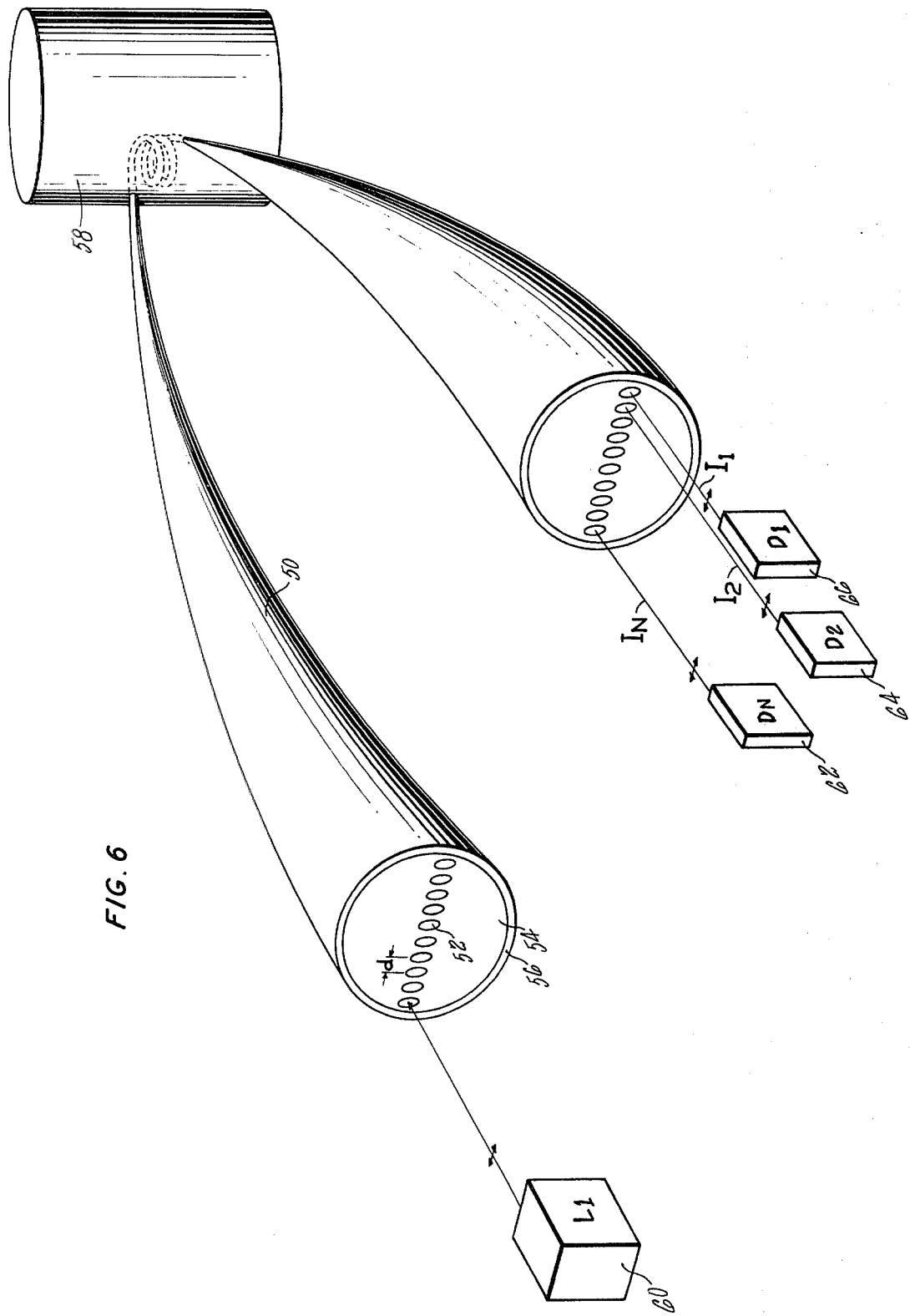
FIG. 6 is a fourth embodiment of an optical fiber according to the present invention having multiple cores for providing an unambiguous response to a wide range of hydrostatic pressure changes.

Referring next to FIG. 6, there is seen another embodiment of an optical fiber according to the present invention which is well suited for operating in a system for measuring the strain or hydrostatic pressure at a location along the length of the fiber. This embodiment includes multiple cores and is well suited to measuring strain or hydrostatic pressure where a wide range of unambiguous readings are needed. An optical fiber 50 has a plurality of cores 52 which are preferably elliptical-shaped in the same manner as described in the dual core case hereinbefore. A first cladding 54 totally surrounds each of the cores 52 throughout the length of the optical fiber 50. A second cladding 56 is positioned along the entire length of the optical fiber on the first cladding 54.

The optical fiber 50 extends through the location where the hydrostatic pressure, such as in a container 58, is to be measured. At the input end of the optical fiber, a source 60 directs a beam of light energy toward an end face of one of the cores 52 so that the beam of energy can be coupled into and guided along the axis of the incident core. At the output end of the fiber the light energy emerges from each of the cores and is presented to a detector, such as detectors 62, 64 and 66 creating a series of electrical signals that varies as the distribution of light energy emerging from the exit face of the optical fiber in the same fashion as described herebefore. The input light energy is preferably polarized where the primary axis of interest is along the short axis of the ellipse and the detectors 62, 64 and 66 include polarizing filters, or equivalent, so that the electrical signal representing the distribution of light energy emerging from the fiber is primarily related to the light energy along the same axis.

In the same manner as described heretofore, a significant feature of the present invention is that the optical fiber 50 can be fabricated so as to be responsive to strain or hydrostatic pressure and at the same time be nonresponsive to temperature through the selection of material for the cores 52 and claddings 54 and 56, size of the cores 52, spacing between adjacent cores, etc. As a result, light energy propagating through one core will be cross-talked, or cross-coupled to adjacent cores as a function of hydrostatic pressure at a predetermined location along the length of the fiber. This particular multicored embodiment provides, among other things, a larger unambiguous range for hydrostatic pressure measurements than can be obtained by using just two cores.

The hereabove discussion of the relationships in the dual core case can be extended to the multicore array by considering the interactions between adjacent cores. It will be appreciated that the use of an increasing number of cores 52 increases the useful range of measurement without decreasing the sensitivity of the optical fiber 50 to changes in strain or hydrostatic pressure. Assuming a linear array of equally spaced core 52, one core will be illuminated with light of intensity $I_0$. The intensity of light $I(M, R)$ emerging from the M'th core for illumination of the R'th core only for a fiber of length L is given by:

$$I(M, R) = I_0 \left(\frac{2}{N+1}\right)^2 \sum_{r,q=1}^{N} \begin{array}{l} \sin [r\pi R/(N+1)] \\ \times \sin [q\pi R/(N+1)] \\ \times \sin [r\pi M/(N+1)] \\ \times \sin [q\pi M/(N+1)] \\ \times \cos [\pi L/\lambda_b (\mu_q - \mu_r)] \end{array} \tag{18}$$

where $\mu_q = 2 \cos [q\pi/(N+1)]$
and M, R = 1, 2, ..., N.

Figure 7:
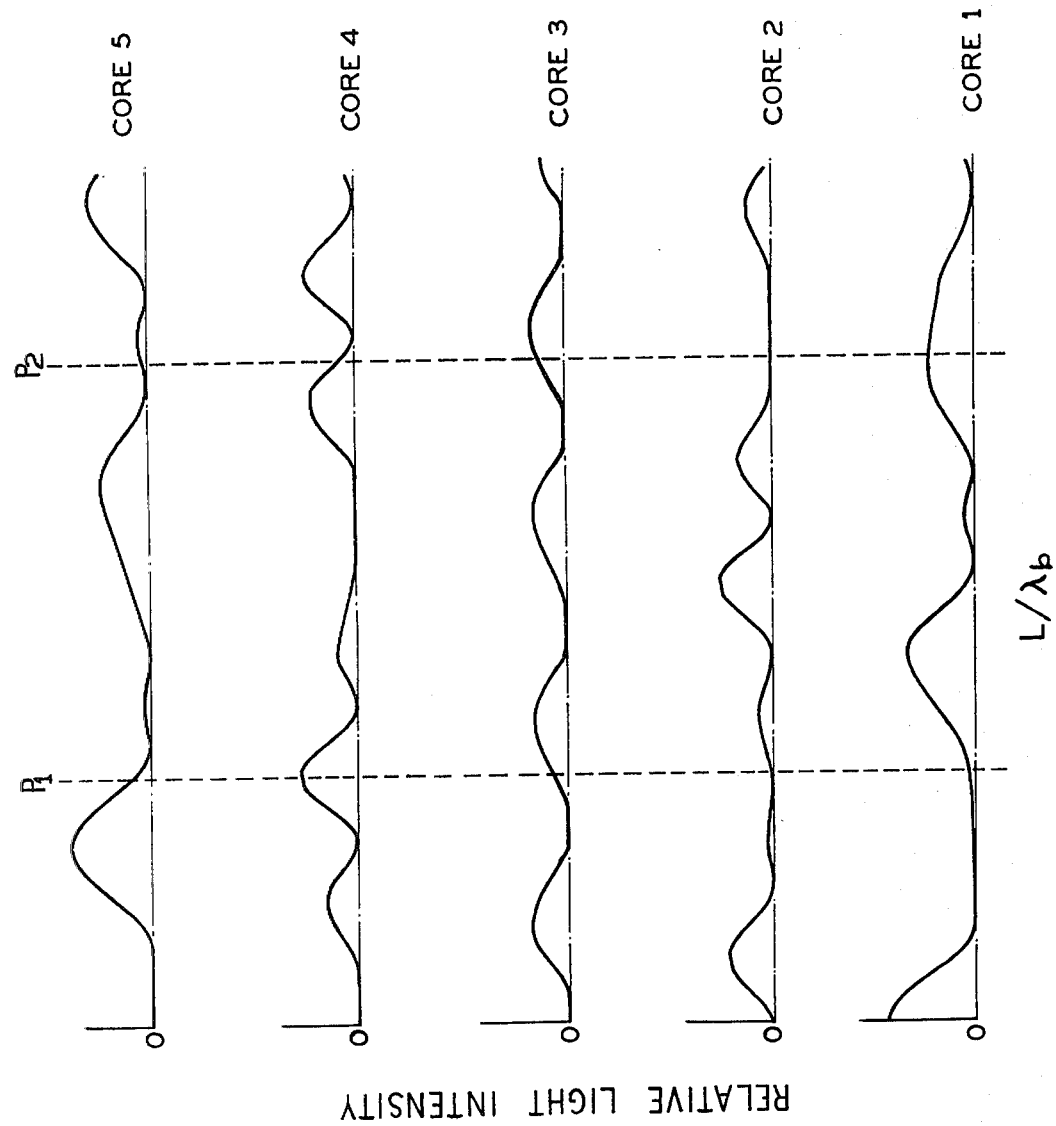
FIG. 7 is a graph depicting the relative light intensity as a function of beat phase of light energy propagating along a five-core fiber.

For the case of five identical cores with one of the cores illuminated, the distribution of light as a function of L might appear as shown in FIG. 7. The relationship of the distribution of light energy emerging from the optical fiber 52 as a function of strain or hydrostatic pressure can be observed from FIG. 7. It should be noted that the abscissa $L/\lambda_b$ is the same as $1/2\pi$ times the beat phase $\phi$. The distribution of light energy emerging from the ends of the core as a function of pressure or strain can be obtained by noting that the beat phase $\phi$ is a linear function of hydrostatic pressure or strain, so that the abscissa is equivalent to the pressure. For example, at $P_1$ the light distribution from the cores 52 is shown by the line $P_1$ in FIG. 7. At pressure $P_2$ the light distribution is shown by the line $P_2$ and the pressures intermediate between $P_1$ and $P_2$ have corresponding distribution of light energy as appear between the lines $P_1$ and $P_2$.

Figure 8:
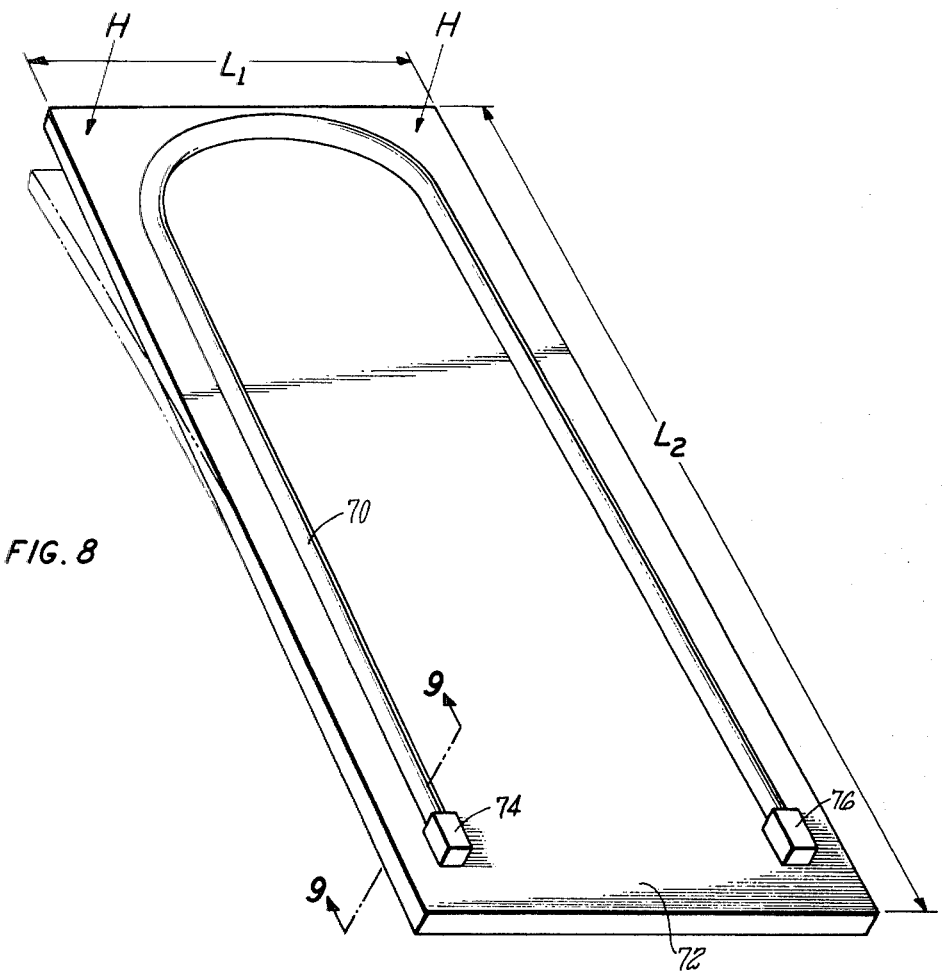
FIG. 8 is a strain sensor which includes an optical fiber according to the present invention that has been attached to a deflectable substrate for measuring deformation of such a substrate.
Figure 9:
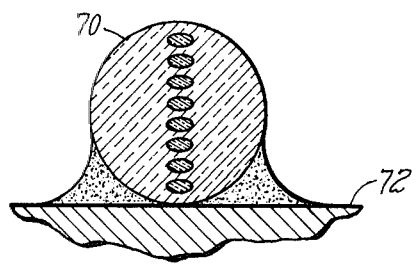
FIG. 9 is a cross-sectional view of the optical fiber depicted in FIG. 7.

Numerous embodiments of a strain or hydrostatic pressure measuring system employing one of the heretofore described embodiments of an optical fiber are possible. For example, referring to FIG. 8, there is shown an embodiment that is particularly well suited to responding to a bending strain. An optical fiber 70 is fixedly attached, by cement or other comparable adhesive, to one face of a support element 72. The support element 72 would be rigidly held at one end (bottom end in the drawing) while the other end would be free to flex or bend through a predetermined range (shown in phantom) in response to an applied force H. The support 42 has its dimension L2 long compared to the dimension L1 for greater sensitivity to the force H. A source 74 of light energy is positioned at the inlet end of the fiber so that light is coupled into one of the cores. A detector 76 is positioned at the exit end of the fiber 70 to measure the light distribution as it emerges from each of the cores and provides an output electrical signal which is proportional to such light distribution. The variation in flex of the support 72 creates corresponding changes in strain on the optical fiber 70. In turn, as heretofore described, this change in stress varies the cross-talk between adjacent cores which is related to the change in intensity of light emerging from the optical fiber 70.

Although this invention has been shown and described with respect to a preferred embodiment, it will be understood by those skilled in this art that various changes in form and detail thereof may be made without departing from the spirit and scope of the claimed invention.

We claim:

1. A strain monitor, comprising:
   strain responsive means including an optical fiber positionable where strain is to be measured, said optical fiber having a plurality of cores which are spaced apart from each other in a cladding, said cladding and each of said plurality of cores being sized and fabricated from such materials as to support only the lowest order propagation mode, thereby allowing cross-talk to occur between said cores;
   source means for generating light to be coupled into one of said cores, said light being cross-talked to adjacent cores in a manner related to strain acting on said optical fiber;
   detector means for receiving light energy emerging from each of said plurality of cores, and for providing an electrical signal related to the intensity of said emerging light; and
   whereby a strain acting on said optical fiber causes a change in the dimensions and refractive indices of said plurality of cores and said cladding such that mode interference between the modes of propagating light energy within said plurality of cores produces a change in the intensity of light emerging from said cores which is uniquely related to such strain acting on said optical fiber.

2. A strain monitor according to claim 1, wherein said optical fiber has a first cladding in which said cores are located, and wherein thermal coefficient of refractive indices for said cores and said first cladding are different causing the beat phase to be dependent upon strain but independent of temperature changes.

3. A strain monitor according to claim 1, wherein said optical fiber includes a first cladding in which said cores are located, and a second cladding surrounding said first cladding, and wherein the thermal coefficient of linear expansion of said second cladding is different from said first cladding, and wherein the thickness of said first cladding and said second cladding are such that the beat phase for cross-talk between said cores varies as a function of strain but is independent of temperature changes.

4. A strain monitor according to claim 1, wherein said optical fiber includes a first cladding in which said cores are located, a second cladding surrounding said first cladding, and a third cladding surrounding said second cladding, and wherein the thermal coefficient of linear expansion of said third cladding is less than the thermal coefficient of linear expansion of said second cladding, wherein the thermal coefficient of linear expansion of said second cladding is different from that of said first cladding and wherein said thickness of said second cladding and said third cladding are such that the beat phase of propagation is a function of strain but is independent of temperature changes.

5. A strain monitor according to claim 1, wherein said optical fiber has a number of cores positioned across the diameter of said cladding, each of which is sized and formed from material so as to support only the lowest order propagation mode, and wherein there is a unique relationship between the intensity of light emerging from said fiber and the pressure acting on said fiber.

6. A strain monitor according to claim 1, wherein the distance separating said plurality of cores and said cladding, the size of said plurality of cores, and the materials parameters of said optical fiber are selected such that the beat phase is independent of temperature.

7. A strain monitor according to claim 6, wherein said strain acting on said strain responsive means is a longitudinal tensile force.

8. A strain monitor according to claim 6, wherein the stress acting on said strain responsive means is a unidirectional transverse force.

9. A strain monitor according to claim 6, wherein the stress acting on said strain responsive means is a uniform hydrostatic pressure.

10. A strain monitor according to claim 1, wherein said plurality of cores of said optical fiber are elliptically shaped having a major axis and a minor axis, and wherein said plurality of cores are positioned adjacent each other in said cladding with their minor axes aligned such that cross-talk therebetween is enhanced.

11. A strain monitor according to claim 10, wherein light presented by said source means to one of said plurality of cores is polarized in the same direction as the minor axis of said plurality of cores, and wherein said detector means includes a polarizer means so that said detector means responds primarily to light which is polarized in the same direction as said minor axis of said elliptically shaped cores.

* * * * *

UNITED STATES PATENT AND TRADEMARK OFFICE
CERTIFICATE OF CORRECTION

PATENT NO. : 4,295,738
DATED : October 20, 1981
INVENTOR(S) : GERALD MELTZ and ELIAS SNITZER It is certified that error appears in the above—identified patent and that said Letters Patent is hereby corrected as shown below:

| | |
|---|---|
| Column 6, line 17 | "but" should read -- and -- |
| Column 7, lines 30 & 31 | delete "for the refractive indices are taken as different" |
| Column 7, line 43 | "be at" should read -- beat -- |
| Column 8, line 1 | "$\theta_1 \neq \zeta_2$" should read -- $\zeta_1 \neq \zeta_2$ -- |
| Column 9, line 8 | "ot" should read -- or -- |
| Column 9, line 35 | "$\vec{=}$" second occurrence should read -- = -- |

Signed and Sealed this

Thirtieth Day of March 1982

[SEAL]

Attest:

*Attesting Officer*

GERALD J. MOSSINGHOFF
*Commissioner of Patents and Trademarks*